United States Patent
Minase et al.

(10) Patent No.: US 8,751,120 B2
(45) Date of Patent: Jun. 10, 2014

(54) DRIVING CONTROL SYSTEM FOR VEHICLE

(71) Applicants: Yuki Minase, Toyota (JP); Masashi Takagi, Nagoya (JP); Motonari Ohbayashi, Nisshin (JP); Hiroshi Shimada, Tajimi (JP); Toshihiro Takagi, Toyota (JP)

(72) Inventors: Yuki Minase, Toyota (JP); Masashi Takagi, Nagoya (JP); Motonari Ohbayashi, Nisshin (JP); Hiroshi Shimada, Tajimi (JP); Toshihiro Takagi, Toyota (JP)

(73) Assignee: Toyota Jidosha Kabushiki, Toyota-shi (JP)

(*) Notice: Subject to any disclaimer, the term of this patent is extended or adjusted under 35 U.S.C. 154(b) by 0 days.

(21) Appl. No.: 13/712,601

(22) Filed: Dec. 12, 2012

(65) Prior Publication Data

US 2013/0166162 A1 Jun. 27, 2013

(30) Foreign Application Priority Data

Dec. 21, 2011 (JP) ................. 2011-280384

(51) Int. Cl.
*B60W 10/10* (2012.01)
*B60W 10/04* (2006.01)
*B60W 10/06* (2006.01)

(52) U.S. Cl.
CPC ............... *B60W 10/10* (2013.01); *B60W 10/04* (2013.01); *B60W 10/06* (2013.01); *B60W 2540/16* (2013.01)
USPC .............................. 701/54; 701/63

(58) Field of Classification Search
CPC ..... B60W 10/10; B60W 10/04; B60W 10/06; B60W 10/11; B60W 30/1846; B60W 2540/16; B60W 1540/165; B60W 2710/0666; F16H 2061/1284
USPC ........ 701/54, 63, 22; 477/3; 180/233, 65.265, 180/65.21
See application file for complete search history.

(56) References Cited

U.S. PATENT DOCUMENTS

| | | | |
|---|---|---|---|
| 6,440,041 B1 * | 8/2002 | Riedle et al. | 477/107 |
| 7,134,982 B2 * | 11/2006 | Ozeki et al. | 477/3 |
| 2010/0006358 A1 | 1/2010 | Ishikawa | |

FOREIGN PATENT DOCUMENTS

JP 2010-018174 A 1/2010

* cited by examiner

*Primary Examiner* — Marthe Marc-Coleman
(74) *Attorney, Agent, or Firm* — Gifford, Krass, Sprinkle, Anderson & Citkowski, P.C.

(57) ABSTRACT

A system includes: a shift mechanism; and a position detecting device detecting an operating position of the shift mechanism on the basis of an output signal of a sensor attached to the shift mechanism. An execution mode of a driving force limiting process that limits driving force is set on the basis of the operating position that is detected by the position detecting device. The driving force limiting process is executed on the basis of the execution mode of the driving force limiting process and a vehicle operation state. When it is determined that there is an abnormality in the position detecting device in a state that the driving force limiting process is not executed, setting the execution mode on the basis of the operating position of the shift mechanism is prohibited, and execution of the driving force limiting process is allowed on the basis of the vehicle operation state.

20 Claims, 8 Drawing Sheets

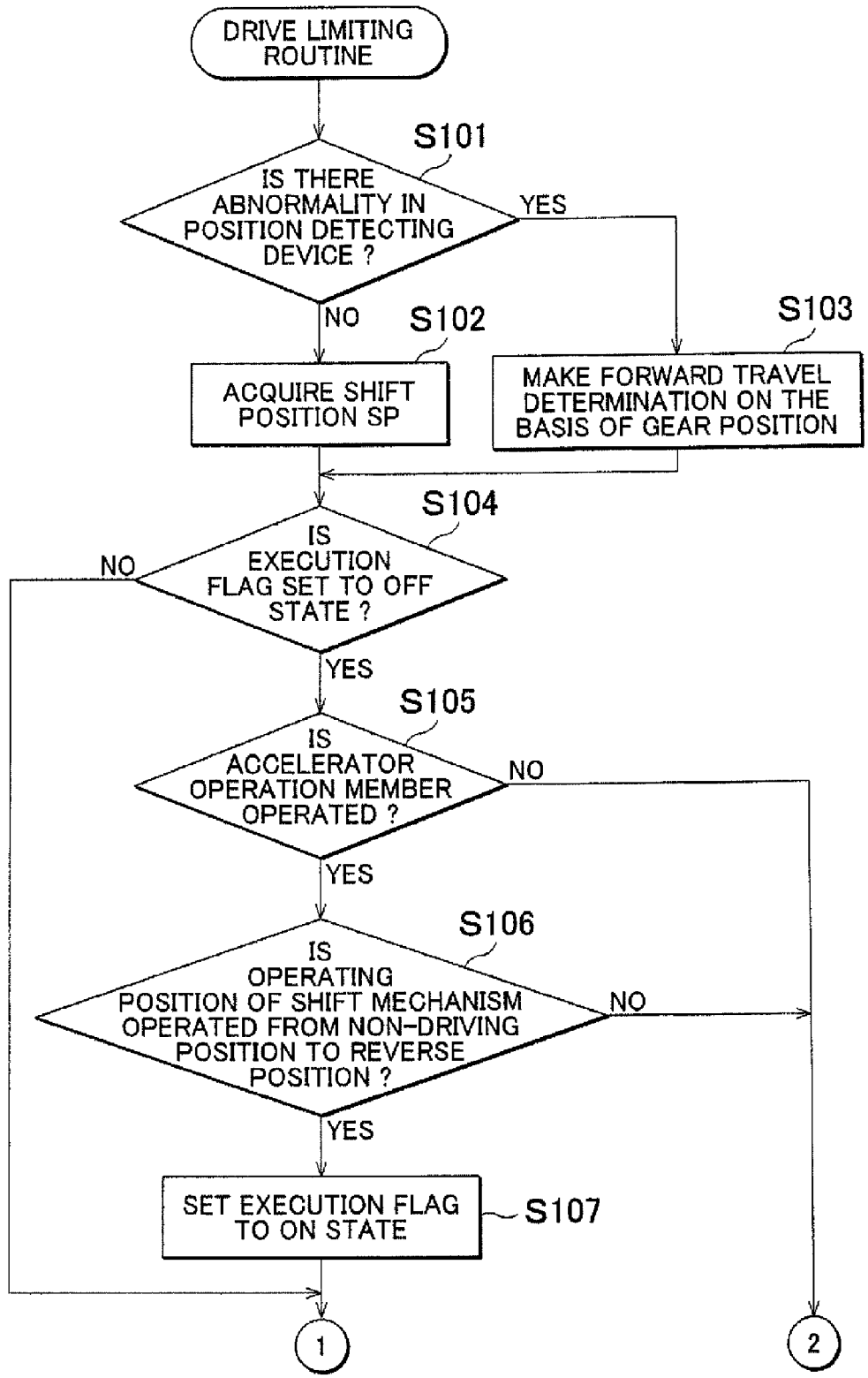

DRIVING CONTROL SYSTEM FOR VEHICLE

INCORPORATION BY REFERENCE

The disclosure of Japanese Patent Application No. 2011-280384 filed on Dec. 21, 2011 including the specification, drawings and abstract is incorporated herein by reference in its entirety.

BACKGROUND OF THE INVENTION

1. Field of the Invention

The invention relates to a driving control system for a vehicle.

2. Description of Related Art

A prime mover, such as an internal combustion engine and an electric motor, is mounted on a vehicle, such as an automobile, as a driving source. In addition, the vehicle includes a shift mechanism that is shifted through driver's operation into a driving position (for example, a position at which the vehicle travels forward or a position at which the vehicle travels backward) or a non-driving position (for example, a parking position or a neutral position). Then, when the shift mechanism is operated to the driving position, driving force is transmitted from the prime mover to wheels. On the other hand, when the shift mechanism is operated to the non-driving position, transmission of driving force from the prime mover to the wheels is interrupted.

There is suggested, in a vehicle in which driving force is transmitted from a prime mover to wheels, an execution mode of driving force limiting process for reducing driving force that is output from the prime mover is set on the basis of an operating position of a shift mechanism and then the driving force limiting process is executed on the basis of an operation state of the vehicle.

Japanese Patent Application Publication No. 2010-18174 (JP 2010-18174 A) describes a system that executes driving force limiting process when a shift mechanism is operated from a non-driving position to a driving position in a state where an accelerator operation member is operated. In this system, even when the shift mechanism is operated from the non-driving position to the driving position in a state where the power of the prime mover is increased as a result of operation of the accelerator operation member, driving force that is transmitted from the prime mover to wheels is suppressed to a small driving force. Therefore, a feeling of strangeness experienced by a driver as a result of transmission of driving force is suppressed, and a decrease in drivability is suppressed.

Usually, when the operating position of the shift mechanism is detected, the operating position of the shift mechanism is detected on the basis of an output signal of a shift position sensor attached to the shift mechanism. Therefore, if there is an abnormality in a position detecting device that detects the operating position of the shift mechanism, such as an abnormality in the shift position sensor and an abnormality in a device that processes the output signal of the shift position sensor, it is not possible to properly detect the operating position. In the above-described system, if there is an abnormality in the position detecting device, it is not possible to appropriately reduce driving force through the driving force limiting process, so drivability decreases.

SUMMARY OF THE INVENTION

The invention provides a driving control system for a vehicle, which is able to properly reduce driving force through driving force limiting process even when there is an abnormality in a position detecting device that detects an operating position of a shift mechanism.

A first aspect of the invention provides a driving control system for a vehicle. The driving control system includes: a shift mechanism that is operated to selectively shift into one of operating positions, that is, a driving position in which driving force that is output from a prime mover is transmitted to a wheel and a non-driving position in which transmission of the driving force from the prime mover to the wheel is interrupted; a position detecting device that detects the operating position of the shift mechanism on the basis of an output signal of a sensor attached to the shift mechanism; and a controller that sets an execution mode of a driving force limiting process that limits the driving force on the basis of the operating position that is detected by the position detecting device, and that executes the driving force limiting process on the basis of the execution mode and a vehicle operation state that is an operation state of the vehicle. In addition, when the controller determines that there is an abnormality in the position detecting device in a state that the driving force limiting process is not executed, the controller prohibits setting the execution mode based on the operating position, and allows the driving force limiting process to be executed on the basis of the vehicle operation state.

In this way, the driving control system according to the first aspect of the invention is able to properly reduce driving force through the driving force limiting process even when there is an abnormality in the position detecting device that detects the operating position of the shift mechanism.

A second aspect of the invention provides a driving control system for a vehicle. The driving control system includes: a shift mechanism that is operated to selectively shift into one of operating positions, that is, a driving position in which driving force that is output from a prime mover is transmitted to a wheel and a non-driving position in which transmission of the driving force from the prime mover to the wheel is interrupted; a position detecting device that detects the operating position of the shift mechanism on the basis of an output signal of a sensor attached to the shift mechanism; and a controller that sets an execution mode of a driving force limiting process that limits the driving force on the basis of the operating position that is detected by the position detecting device, and that executes the driving force limiting process on the basis of the execution mode and a vehicle operation state that is an operation state of the vehicle. In addition, when the controller determines that there is an abnormality in the position detecting device in a state that the driving force limiting process is being executed, the controller holds the execution mode that has been set immediately before the abnormality occurs.

In this way, the driving control system according to the second aspect of the invention is able to properly reduce driving force through the driving force limiting process even when there is an abnormality in the position detecting device that detects the operating position of the shift mechanism.

A third aspect of the invention provides a driving control system for a vehicle. The driving control system includes: a shift mechanism that is operated to selectively shift into one of operating positions, that is, a driving position in which driving force that is output from a prime mover is transmitted to a wheel and a non-driving position in which transmission of the driving force from the prime mover to the wheel is interrupted; a position detecting device that detects the operating position of the shift mechanism on the basis of an output signal of a sensor attached to the shift mechanism; and a controller that sets an execution mode of a driving force limiting process that limits the driving force on the basis of the operating position that is detected by the position detecting device, and that executes the driving force limiting process on the basis of the execution mode and a vehicle operation state that is an operation state of the vehicle. In addition, when the controller determines that there is an abnormality in the position detecting device in a state that the driving force limiting process is not executed, the controller prohibits execution of the driving force limiting process.

In this way, the driving control system according to the third aspect of the invention is able to properly reduce driving force through the driving force limiting process even when there is an abnormality in the position detecting device that detects the operating position of the shift mechanism.

A fourth aspect of the invention provides a driving control system for a vehicle. The driving control system includes: a shift mechanism that is operated to selectively shift into one of operating positions, that is, a driving position in which driving force that is output from a prime mover is transmitted to a wheel and a non-driving position in which transmission of the driving force from the prime mover to the wheel is interrupted; a position detecting device that detects the operating position of the shift mechanism on the basis of an output signal of a sensor attached to the shift mechanism; and a controller that sets an execution mode of a driving force limiting process that limits the driving force on the basis of the operating position that is detected by the position detecting device, and that executes the driving force limiting process on the basis of the execution mode and a vehicle operation state that is an operation state of the vehicle. In addition, when there is an abnormality in the position detecting device, the controller uses an operating position of the shift mechanism that is estimated on the basis of a driving state of the vehicle, as a setting parameter for setting the execution mode of the driving force limiting process, instead of the operating position that is detected by the position detecting device.

In this way, the driving control system according to the fourth aspect of the invention is able to properly reduce driving force through the driving force limiting process even when there is an abnormality in the position detecting device that detects the operating position of the shift mechanism.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 2A and 2B are a flowchart that shows the execution procedure of a drive limiting routine according to the first embodiment;

DETAILED DESCRIPTION OF EMBODIMENTS

Figure 1:
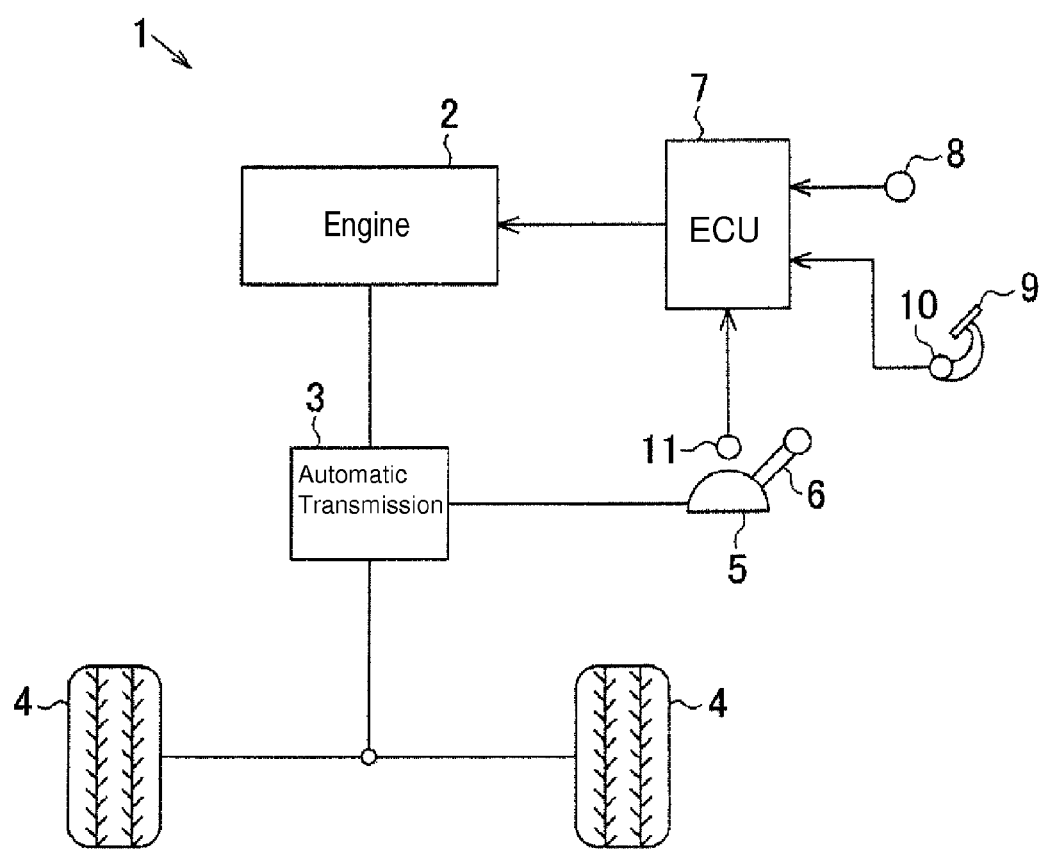
FIG. 1 is a schematic view that shows the schematic configuration of a driving control system for a vehicle according to a first embodiment of the invention.

Hereinafter, a driving control system for a vehicle according to a first embodiment of the invention will be described. As shown in FIG. 1, an internal combustion engine 2 and an automatic transmission 3 are mounted on a vehicle 1. The internal combustion engine 2 is a drive source. The automatic transmission 3 automatically executes gear shift operation. Then, driving force output from the internal combustion engine 2 is transmitted to wheels 4 via the automatic transmission 3, and the like. By so doing, the wheels 4 rotate, and the vehicle 1 travels. The automatic transmission 3 includes a plurality of gears. The automatic transmission 3 is able to change a combination of those plurality of gears such that any one of a plurality of predetermined gear positions is selected and established. In addition, the automatic transmission 3 is able to transmit driving force, which is output from the internal combustion engine 2, to the wheels 4 or interrupt transmission of driving force that is output from the internal combustion engine 2.

A shift mechanism 5 is installed in the vehicle 1. The shift mechanism 5 is used to change an operation mode of the automatic transmission 3. A select lever 6 of the shift mechanism 5 is coupled to the automatic transmission 3 (specifically, a shift fork thereof). Then, the select lever 6 is operated to shift into any one of a plurality of operating positions by a driver. The plurality of operating positions include a parking position, a reverse travel (reverse) position, a neutral position and a forward travel (drive) position. Hereinafter, the operation mode of the automatic transmission 3 for each operating position of the select lever 6 will be described.

When the select lever 6 is operated to the parking position, rotation of the wheels 4 is prohibited through meshing of the gears in the automatic transmission 3, and transmission of driving force, which is output from the internal combustion engine 2, to the wheels 4 is interrupted. When the select lever 6 is operated to the neutral position, the above-described prohibition of rotation of the wheels 4 through meshing of the gears in the automatic transmission 3 is released, and transmission of driving force, which is outputted from the internal combustion engine 2, to the wheels 4 is interrupted. When the select lever 6 is operated to the drive position, driving force that is outputted from the internal combustion engine 2 is transmitted to the wheels 4 in a forward rotation direction. At this time, the vehicle 1 is allowed to travel forward. When the select lever 6 is operated to the reverse position, driving force that is outputted from the internal combustion engine 2 is transmitted to the wheels 4 in a reverse rotation direction. At this time, the vehicle 1 is allowed to travel backward.

An electronic control unit 7 (controller) is mounted on the vehicle 1. The electronic control unit 7 executes various controls associated with the internal combustion engine 2, the automatic transmission 3, and the like. In addition, various sensors are attached to the vehicle 1. Those sensors, for example, include a vehicle speed sensor 8 and an accelerator position sensor 10. The vehicle speed sensor 8 is used to detect a travel speed (vehicle speed SPD) of the vehicle 1. The accelerator position sensor 10 is used to detect an operation amount (accelerator operation amount ACC) of an accelerator operation member 9 (accelerator pedal, accelerator lever, or the like). Other than that, a shift position sensor 11, and the like, are also provided. The shift position sensor 11 is attached to the shift mechanism 5, and is used to detect an operating position (shift position SP) of the shift mechanism 5 (specifically, the select lever 6 thereof). Output signals of various sensors are input to the electronic control unit 7. A drive circuit for driving the internal combustion engine 2, a drive circuit for driving the automatic transmission 3, and the like, are connected to the electronic control unit 7.

The electronic control unit 7 adjusts driving force, which is output from the internal combustion engine 2, on the basis of the accelerator operation amount ACC, or the like. In addition, the electronic control unit 7 shifts the gear position in the automatic transmission 3 on the basis of the accelerator operation amount ACC, the vehicle speed SPD and the shift position SP.

At the time of a start of the vehicle 1, the driver usually shifts the operating position of the select lever 6 from the non-driving position (the parking position or the neutral position) to the driving position (the drive position or the reverse position) and then operates the accelerator operation member 9 in an off state to an on state. However, when the driver is hurrying, an operation from an off state of the accelerator operation member 9 to an on state thereof (hereinafter, referred to as "on operation" where appropriate) may be performed earlier than an operation to shift from the non-driving position of the select lever 6 to the driving position thereof. In this case, even when the driver has an intention of performing the above-described usual operation, an operation different from the normal operation, that is, a shift from the non-driving position of the select lever 6 to the driving position thereof is actually performed in a state where the accelerator operation member 9 undergoes on operation.

When the driver unintentionally performs such an operation different from the usual operation, the behavior of the vehicle 1, which is expected by the driver, may differ from an actual behavior. More specifically, the driver intends to start the vehicle 1 when the driver operates the accelerator operation member 9 to an on state. In contrast to this, actually, when the select lever 6 is shifted from the non-driving position to the driving position after the accelerator operation member 9 undergoes on operation, the driving force of the internal combustion engine 2 is transmitted to the wheels 4, and the vehicle 1 starts moving. Such a lag of the behavior of the vehicle 1 makes the driver experience a feeling of strangeness, so it becomes one of factors that decrease the drivability of the vehicle 1.

In addition, while the vehicle 1 is travelling forward, the position of the driver seated on a seat is usually natural. In contrast to this, while the vehicle 1 is travelling backward, the driver mostly takes an unreasonable position, such as a position that the body is twisted to watch the backward of the vehicle while the driver is seated on the seat. Therefore, while the vehicle 1 is travelling backward, it is difficult to minutely operate the accelerator operation member 9 as compared with while the vehicle 1 is travelling forward, and it is also difficult to minutely adjust driving force that is output from the internal combustion engine 2 and that is transmitted to the wheels 4. Thus, while the vehicle 1 is travelling backward, the behavior of the vehicle 1, which is expected by the driver, tends to differ from an actual behavior. Therefore, while the vehicle 1 is travelling backward, it easily leads to a decrease in drivability.

In the present embodiment, when the select lever 6 is operated to shift from the non-driving position (the parking position or the neutral position) to the reverse position in a state where the accelerator operation member 9 undergoes an operation, a driving force limiting process is executed. In the driving force limiting process, driving force that is output from the internal combustion engine 2 is suppressed as compared with when usual operation is performed. In the present embodiment, when the select lever 6 is operated to shift from the non-driving position to the drive position in a state where the accelerator operation member 9 undergoes an operation, the driving force limiting process is not executed.

The system according to the present embodiment executes the above-described driving force limiting process when an operation from an off state of the accelerator operation member 9 to an on state thereof is performed before the operating position of the select lever 6 is shifted from the non-driving position to the reverse position, that is, for example, when the driver intends to hastily start the vehicle 1. By so doing, even when the select lever 6 is shifted from the non-driving position to the reverse position in a state where the driver operates the accelerator operation member 9 to an on state, the above-described driving force limiting process is executed, so driving force that is output from the internal combustion engine 2 is suppressed. Therefore, a feeling of strangeness experienced by the driver as a result of a start of travel of the vehicle 1 through transmission of driving force to the wheels 4 is suppressed, so a decrease in the drivability of the vehicle 1 is suppressed.

In addition, while the vehicle 1 is travelling forward, that is, when it is possible to minutely operate the accelerator operation member 9, driving force is not limited through the driving force limiting process, so the driving force of the vehicle 1 is adjusted through actual driver's operation of the accelerator operation member 9. Then, while the vehicle 1 is travelling backward, that is, when it is difficult to minutely operate the accelerator operation member 9, driving force is limited through the driving force limiting process, so the vehicle 1 is operated in a small driving force state and a change in the behavior of the vehicle 1 is gentle. Thus, a decrease in drivability is suppressed. In the above-described embodiment, driving force that is output from the internal combustion engine 2 is properly limited on the basis of the travel direction of the vehicle 1.

In the present embodiment, the driving force limiting process is stopped when one of the following conditions 1 and 2 is satisfied while the driving force limiting process is being executed. The condition 1 is that the operating position of the shift mechanism 5 is set at a position other than the reverse position. The condition 2 is that a driving force that should be output from the internal combustion engine 2 on the basis of the accelerator operation amount ACC is smaller than a control driving force that is a driving force suppressed through the driving force limiting process, for example, when driver's on operation of the accelerator operation member 9 is released and the accelerator operation amount ACC becomes "0".

Here, in the present embodiment, the shift position SP is detected through arithmetic processing that is executed by the electronic control unit 7 on the basis of an output signal of the shift position sensor 11. Therefore, when there is an abnormality in a position detecting device for detecting the shift position SP, such as the shift position sensor 11, the electronic control unit 7 and a line that connects those shift position sensor 11 and electronic control unit 7, it is not possible to properly detect the shift position SP. In this case, it is not possible to appropriately suppress driving force through the driving force limiting process, so drivability decreases.

In the present embodiment, when there occurs an abnormality in the position detecting device for detecting the shift position SP, the shift position SP is not used as a setting parameter for setting the execution mode (specifically, determining whether to execute) the driving force limiting process. Then, at this time, determination as to whether the vehicle 1 is travelling forward (hereinafter, may be referred to as "forward travel determination") is made on the basis of the driving state of the vehicle 1 (in the present embodiment, the gear position of the automatic transmission 3, which is recognized by the electronic control unit 7), and a result of the determination is used as the above-described setting parameter. In the present embodiment, the electronic control unit 7 functions as a speed ratio detecting device that detects a speed ratio of the automatic transmission 3. In addition, in the present embodiment, the execution mode of the driving force limiting process, which is set on the basis of the operating position of the shift mechanism 5, is whether to execute the driving force limiting process.

In the system according to the present embodiment, at the time when the vehicle 1 travels forward, as the travel speed of the vehicle 1 increases, the gear position of the automatic transmission 3 is changed to a high-speed-side gear position having a smaller speed ratio. On the other hand, at the time when the vehicle 1 travels backward, it is not assumed that the travel speed increases as in the case where the vehicle 1 travels forward. Therefore, irrespective of the travel speed of the vehicle 1, a lowest-speed-side gear position having a large speed ratio is set as the gear position of the automatic transmission 3. By so doing, in the vehicle 1, when a gear position other than the lowest-speed-side gear position is set as the gear position of the automatic transmission 3, it is possible to accurately determine that the vehicle 1 is travelling forward. In the present embodiment, on the basis of the above concept, forward travel determination is made on the basis of the gear position of the automatic transmission 3, which is detected by the electronic control unit 7.

According to the present embodiment, even when there is an abnormality in the position detecting device for detecting the shift position SP, it is possible to accurately determine that the vehicle 1 is travelling forward through the above-described forward travel determination. Therefore, it is possible to reduce erroneous determination that the shift mechanism 5 is operated to the reverse position although the shift mechanism 5 is actually operated to the drive position or erroneous determination that the shift mechanism 5 is operated to the drive position although the shift mechanism 5 is actually operated to the reverse position. Thus, it is possible to reduce the following state 1 or 2 due to such erroneous determination. State 1: Due to erroneous determination that the shift mechanism 5 is operated to the reverse position although the shift mechanism 5 is actually operated to the drive position in a state that the driving force limiting process is not executed, the driving force limiting process is started, and driving force that is output from the internal combustion engine 2 is unnecessarily reduced. State 2: Due to erroneous determination that the shift mechanism 5 is operated to the drive position although the shift mechanism 5 is actually operated to the reverse position in a state that the driving force limiting process is being executed, the driving force limiting process is stopped.

According to the present embodiment, when there occurs an abnormality in the position detecting device, it is possible to use the result of forward travel determination based on the gear position of the automatic transmission 3 as the setting parameter for setting the execution mode of the driving force limiting process without using the operating position (shift position SP) detected by the position detecting device. Therefore, even when there is an abnormality in the position detecting device, it is possible to suppress a start of the driving force limiting process at an undesirable timing or a stop of the driving force limiting process at an undesirable timing, so it is possible to properly reduce driving force through the driving force limiting process.

Hereinafter, the execution procedure and operation of a drive limiting routine that includes the above-described driving force limiting process will be described in detail with reference to the flowchart shown in FIGS. 2A and 2B. Note that a series of processes shown in the flowchart are periodically executed by the electronic control unit 7 as, for example, an interrupt at predetermined time intervals.

Figure 2B:
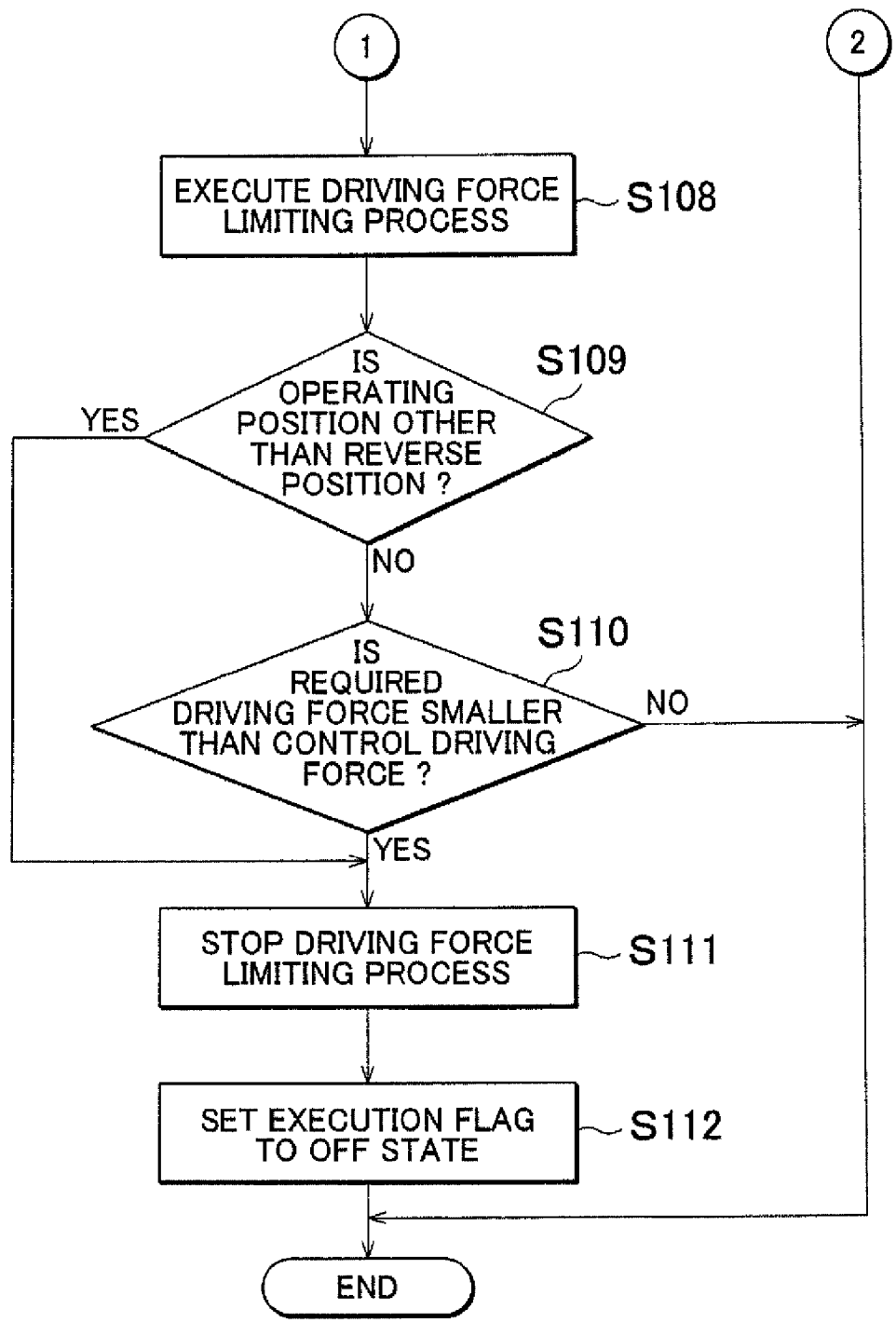

As shown in FIGS. 2A and 2B, the routine initially determines whether there is an abnormality in the position detecting device (S101). Here, an abnormality of the position detecting device is determined by determining any one of an abnormality of the shift position sensor 11, an abnormality of the electronic control unit 7 and an abnormality (break or short-circuit) of a line that connects the shift position sensor 11 and electronic control unit 7.

When it is not determined that there is an abnormality in the position detecting device (NO in S101), the shift position SP is acquired (S102). In this case, in the following processes, the operating position of the shift mechanism 5, which is determined from the shift position SP, is used as the setting parameter for setting the execution mode of the driving force limiting process.

On the other hand, when it is determined that there is an abnormality in the position detecting device (YES in S101), the gear position of the automatic transmission 3 is acquired, and forward travel determination is made on the basis of the gear position (S103). Then, on the basis of the result of the forward travel determination, the operating position of the shift mechanism 5 at the time of the forward travel determination is identified and stored. Specifically, when it is determined that the vehicle 1 is travelling forward through the forward travel determination, the drive position is stored as the operating position of the shift mechanism 5 at the time when it is determined that the vehicle 1 is travelling forward. In addition, when it is not determined that the vehicle 1 is travelling forward through the forward travel determination, the operating position stored at the time when the process has been executed last time is stored as the operating position of the shift mechanism 5 at the time of the forward travel determination. Then, the thus stored operating position of the shift mechanism 5 is used as the above-described setting parameter in the following processes.

After that, it is determined whether an execution flag is set to an off state (S104). The execution flag is set to an on state when the driving force limiting process (S108) is started. On the other hand, the execution flag is set to an off state when the driving force limiting process is stopped. In the process of S104, on the basis of the state of the execution flag, it is determined whether the driving force limiting process is stopped.

When the execution flag is set to an off state (YES in S104), it is determined that the driving force limiting process is not executed, and then it is determined whether to start the driving force limiting process (S105 and S106). Here, when the following conditions 3 and 4 both are satisfied, it is determined to start the driving force limiting process. Condition 3: The accelerator operation member 9 is operated to an on state. Specifically, the accelerator operation amount ACC is larger than a predetermined value. Condition 4: The operating position of the shift mechanism 5 at the time when the routine is executed last time is the non-driving position, and the operating position of the shift mechanism 5 at the time when the routine is executed this time is the reverse position.

When at least one of these conditions 3 and 4 is not satisfied (NO in S105 or NO in S106), it is determined not to start the driving force limiting process. Then, the routine once ends without executing the following processes.

On the other hand, after that, when the routine is repeatedly executed and both the conditions 3 and 4 are satisfied (YES in S105 and YES in S106), the execution flag is set to an on state (S107), and the driving force limiting process is started (S108). The execution procedure of the driving force limiting process will be described later. After that, unless the execution flag is set to an off state (NO in S104), the driving force limiting process is continued.

While the driving force limiting process is being executed (NO in S104 or YES in S106), processes associated with an end of the driving force limiting process (processes of S109 to S112) are executed. Specifically, initially, it is determined whether one of the condition 1 and the condition 2 is satisfied. When both the condition 1 and the condition 2 are not satisfied (NO in S109 and NO in S110), the driving force limiting process is not stopped but continued (the processes of S111 and S112 are skipped). After that, when the processes of the routine are repeatedly executed and the condition 1 is satisfied (YES in S109) or when the condition 2 is satisfied (YES in S110), the driving force limiting process is stopped (S111), and the execution flag is set to an off state (S112), after which the routine once ends. By so doing, thereafter, limiting driving force that is output from the internal combustion engine 2 is stopped, and the driving force is adjusted so as to coincide with a required driving force that is a driving force that should be output from the internal combustion engine 2 on the basis of the accelerator operation amount ACC.

In this way, in the drive limiting routine according to the present embodiment, in the process of determining whether to execute the driving force limiting process (S106, S109), the operating position that is acquired from the shift position SP is used when there is no abnormality in the position detecting device, and the operating position that is acquired from the gear position of the automatic transmission 3 is used when there is an abnormality in the position detecting device. Therefore, even when there is an abnormality in the position detecting device, it is possible to properly reduce driving force through the driving force limiting process.

Figure 3:
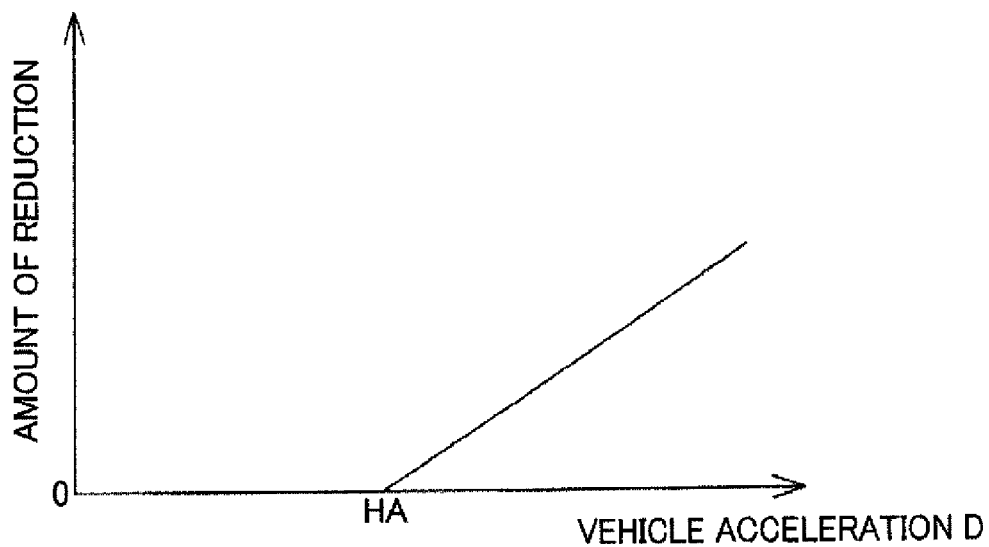
FIG. 3 is a graph that shows the correlation between an amount of reduction of driving force and a vehicle acceleration through driving force limiting process.
Figure 4:
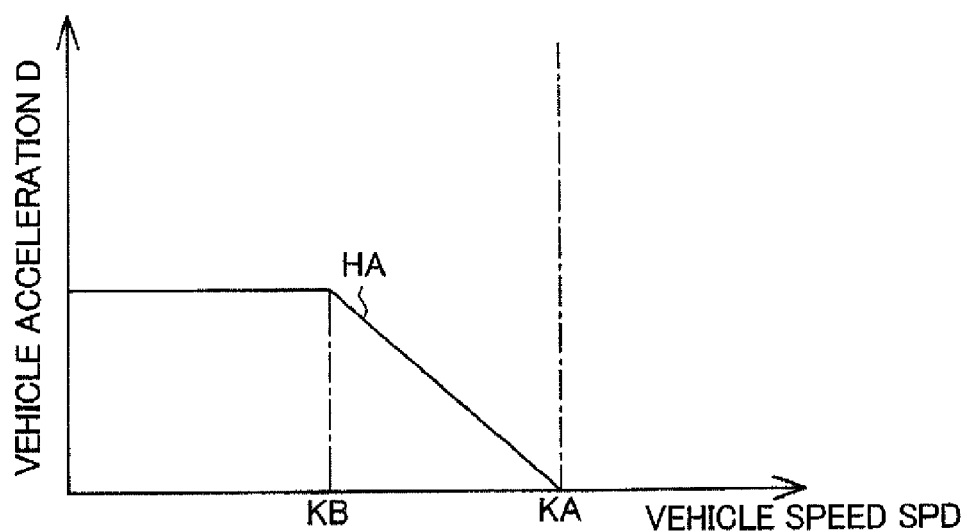
FIG. 4 is a graph that shows the correlation between a vehicle acceleration, a vehicle speed and a determination value in the driving force limiting process.

Hereinafter, a mode of limiting the driving force in the driving force limiting process (the process of step S108 in FIG. 2B) will be described in detail with reference to FIG. 3 and FIG. 4. In the driving force limiting process, driving force that is output from the internal combustion engine 2 is suppressed by reducing the driving force by an amount of reduction. Thus, as the amount of reduction is increased, the degree of suppressing the driving force through the driving force limiting process increases. The degree of suppressing driving force is changed on the basis of an acceleration (vehicle acceleration D) in a travel direction of the vehicle 1. The vehicle acceleration D is obtained on the basis of a detected signal of the vehicle speed sensor 8. For example, as the vehicle acceleration D increases, the degree of suppressing driving force that is output from the internal combustion engine 2 is increased by increasing the amount of reduction. More specifically, for example, as shown in FIG. 3, when the vehicle acceleration D is lower than a determination value HA, the degree of suppressing the driving force is set to "0" by setting the amount of reduction to "0". On the other hand, when the vehicle acceleration D is higher than or equal to the determination value HA, as the vehicle acceleration D increases with respect to the determination value HA, the degree of suppressing driving force that is output from the internal combustion engine 2 is increased to above "0" by setting the amount of reduction to above "0".

By executing the driving force limiting process as described above, driving force is suppressed such that the driver does not experience a feeling of strangeness while unnecessary suppression of driving force that is output from the internal combustion engine 2 is avoided. In addition, in a situation that the vehicle 1 is escaped of a muddy road, the driver may repeatedly operate the select lever 6 to shift between the non-driving position and the driving position. At this time, the select lever 6 may be shifted from the non-driving position to the reverse position in a state where the accelerator operation member 9 is operated to an on state. When the vehicle 1 is driven out of a slushy road in this way, even when the select lever 6 is shifted from the non-driving position to the reverse position in a state where the accelerator operation member 9 is operated to an on state, the vehicle acceleration D is hard to increase, so the degree of suppressing the driving force through the driving force limiting process reduces. Thus, it is possible to prevent a state that suppressing the driving force through the driving force limiting process inhibits the vehicle 1 from being driven out of a slushy road. Thus, the drivability of the vehicle 1 improves, for example, when the vehicle 1 is driven out of a slushy road.

The determination value HA that is used in the driving force limiting process is variably set on the basis of the vehicle speed SPD so as to be an optimal value determined in advance through an experiment, or the like. The determination value HA, for example, changes with the vehicle speed SPD as indicated by the solid line in FIG. 4. As is apparent from FIG. 4, when vehicle speed SPD is lower than a predetermined speed KB, the determination value HA is constant at an optimal value determined in advance through an experiment, or the like. In addition, when the vehicle speed SPD is higher than or equal to the predetermined speed KB and is lower than a reference speed KA, the determination value HA is gradually reduced with an increase in the vehicle speed SPD. Furthermore, when the vehicle speed SPD is higher than or equal to the reference speed KA, the determination value HA is set to "0". Thus, at the time of executing the driving force limiting process, when the vehicle speed SPD is higher than or equal to the reference speed KA, the degree of suppressing driving force that is output from the internal combustion engine 2 is increased to above "0" on the basis of the vehicle acceleration D irrespective of a magnitude relationship between the vehicle acceleration D and the determination value HA. That is, in order to increase the degree of suppressing driving force that is output from the internal combustion engine 2 to above "0" as described above, the amount of reduction is set to a value that is larger than "0" on the basis of the vehicle acceleration D. In this case, at the time of executing the driving force limiting process, when the vehicle speed SPD is higher than the reference speed KA, that is, when the driver tends to experience a feeling of strangeness, it is possible to suppress the feeling of strangeness by adequately suppressing the driving force.

As described above, according to the present embodiment, advantageous effects described below are obtained.

1) When there is an abnormality in the position detecting device, the determination result as to the forward travel determination made on the basis of the gear position of the automatic transmission 3, which is acquired by the electronic control unit 7 at this time instead of using the shift position SP, as the setting parameter for setting the execution mode of the driving force limiting process. Therefore, even when there occurs an abnormality in the position detecting device, when the reliability of the operating position, which is detected by the position detecting device, is low, it is possible to prohibit setting the execution mode on the basis of the operating position, so it is possible to suppress a start of the driving force limiting process at an undesirable timing or a stop of the driving force limiting process at an undesirable timing, and it is possible to properly reduce driving force through the driving force limiting process. In a vehicle on which an automatic transmission that automatically carries out gear shift operation is mounted, as the travel speed increases, the speed ratio of the automatic transmission decreases. In addition, the travel speed does not become so high when the vehicle travels backward as to when the vehicle travels forward, so the speed ratio of the automatic transmission at the time when the vehicle travels backward is set so as not to be lower than the speed ratio at the time when the vehicle travels forward. Therefore, in the vehicle on which the automatic transmission is mounted, it may be accurately determined that the vehicle is travelling forward on the basis of the fact that the speed ratio of the automatic transmission is decreased.

In this way, according to the present embodiment, even when there is an abnormality in the position detecting device that detects the operating position of the shift mechanism, it is possible to accurately determine that the vehicle is travelling forward on the basis of the speed ratio of the automatic transmission, so it is possible to accurately set the execution mode of the driving force limiting process on the basis of at least the fact that the shift mechanism is operated to a forward travel position or the fact that the shift mechanical has been operated to the forward travel position.

2) When the operating position of the shift mechanism 5 is operated from the non-driving position to the reverse position, driving force that is output from the internal combustion engine 2 is limited; whereas, when the operating position of the shift mechanism 5 is operated from the non-driving position to the drive position, the driving force is not limited. The execution mode of the driving force limiting process is set in this way. Therefore, when there is no abnormality in the position detecting device, it is possible to properly limit driving force, which is output from the internal combustion engine 2, on the basis of the travel direction of the vehicle 1. In addition, even when there is an abnormality in the position detecting device, the driving force limiting process is allowed to be executed on the basis of the vehicle operation state, so it is possible to properly reduce driving force through the driving force limiting process. That is, it is possible to suppress a decrease in drivability by executing the driving force limiting process. In addition, the operation amount of the accelerator operation member is used as the vehicle operation state. With the system, when it is not determined that there is an abnormality in the position detecting device, for example, the degree of limiting driving force is increased when the shift mechanism is operated to a reverse travel position as compared with when the shift mechanism is operated to a forward travel position. In this way, it is possible to set the execution mode on the basis of the operating position of the shift mechanism, and to execute the driving force limiting process on the basis of the execution mode and the operation amount of the accelerator operation member. Moreover, when it is determined that there is an abnormality in the position detecting device, it is possible to execute the driving force limiting process on the basis of the vehicle operation state irrespective of the operating position of the shift mechanism, which is detected by the position detecting device and of which the reliability is low.

Hereinafter, a driving control system for a vehicle according to a second embodiment of the invention will be described by focusing on the difference from the first embodiment. Hereinafter, like reference numerals denote similar components to those of the first embodiment, and the detailed description of the components is omitted.

The driving control system for a vehicle according to the present embodiment differs from the driving control system for a vehicle according to the first embodiment in the execution mode of a drive limiting routine. Hereinafter, the drive limiting routine according to the present embodiment will be described.

In the drive limiting routine (FIG. 2) according to the first embodiment, when it is not determined that there is an abnormality in the position detecting device (NO in S101), the operating position of the shift mechanism 5, which is acquired on the basis of the shift position SP that is detected by the position detecting device, is used as the setting parameter for setting the execution mode of the driving force limiting process (S102). On the other hand, when it is determined that there is an abnormality in the position detecting device (YES in S101), the result of the forward travel determination made on the basis of the gear position of the automatic transmission 3 is used as the above setting parameter (S103).

In contrast to this, in the drive limiting routine according to the present embodiment, when it is determined that there is an abnormality in the position detecting device or when it is not determined that there is an abnormality in the position detecting device, the operating position of the shift mechanism 5, which is acquired from the shift position SP, is used as the above setting parameter. That is, in the present embodiment, the process of S101 and the process of S103 in the drive limiting routine (FIG. 2) according to the first embodiment are not executed.

Then, in the drive limiting routine according to the present embodiment, when it is determined that there is an abnormality in the position detecting device in a state that the driving force limiting process is not executed, the driving force limiting process is prohibited thereafter. That is, there is provided the shift mechanism that is operated to selectively shift into any one of the driving position in which driving force that is output from the prime mover is transmitted to the wheels and the non-driving position in which transmission of driving force from the prime mover to the wheels is interrupted. In addition, there is provided the position detecting device that detects the operating position of the shift mechanism on the basis of an output signal of a sensor attached to the shift mechanism. The driving force limiting process that limits the driving force is executed on the basis of the execution mode and the vehicle operation state, in which the execution mode is set on the basis of the operating position of the shift mechanism, which is detected by the position detecting device. This avoids a state that the driving force limiting process is started through determination (specifically, the condition 4) based on the shift position SP detected by the position detecting device that has an abnormality. Specifically, this avoids a state that the driving force limiting process is started through the above condition 4 as a result of erroneous determination that the shift mechanism 5 is operated to the reverse position although the shift mechanism 5 is actually operated to the drive position in a state that the driving force limiting process is not executed. Therefore, according to the present embodiment, it is possible to suppress unnecessary execution of the driving force limiting process. Thus, it is possible to suppress an unnecessary decrease in driving performance of the vehicle 1 due to an unnecessary reduction in driving force that is output from the internal combustion engine 2. In addition, when it is not determined that there is an abnormality in the position detecting device, it is possible to start the driving force limiting process at a proper timing on the basis of determination as to the condition 3 based on the accelerator operation amount ACC and the condition 4 based on the shift position SP that is detected by the position detecting device. In other words, when it is not determined that there is an abnormality in the position detecting device, it is possible to execute the driving force limiting process on the basis of the operating position that is detected by the position detecting device and the vehicle operation state.

In addition, in the drive limiting routine according to the present embodiment, when it is determined that there is an abnormality in the position detecting device in a state that the driving force limiting process is being executed, not determination as to the condition 1 based on the operating position of the shift mechanism 5 but determination as to the condition 2 based on the driving force of the internal combustion engine 2 is made in order to determine whether to stop the driving force limiting process.

By so doing, in a state that the driving force limiting process is being executed, even when the operating position of the shift mechanism 5, which is acquired from the shift position SP that is detected by the position detecting device, becomes a position other than the reverse position, the driving force limiting process is not stopped but continued. In other words, the execution mode of the driving force limiting process, which has been set on the basis of the shift position SP immediately before the abnormality occurs, is held without being changed even after the abnormality has occurred. Therefore, even if the condition 1 is satisfied through erroneous determination that the shift mechanism 5 is operated to a position other than the reverse position although the shift mechanism 5 is actually operated to the reverse position, determination itself based on the condition 1 is not made, so an erroneous stop of the driving force limiting process is avoided. Moreover, when the condition 2 based on the driving force of the internal combustion engine 2 is satisfied, the driving force limiting process is stopped. In the present embodiment, the execution mode of the driving force limiting process, which is set on the basis of the operating position of the shift mechanism 5, is whether to execute the driving force limiting process.

In addition, when it is not determined that there is an abnormality in the position detecting device in a state that the driving force limiting process is not executed, it is determined whether one of the condition 1 and the condition 2 is satisfied in order to determine whether to stop the driving force limiting process. Therefore, the driving force limiting process is stopped at an appropriate timing based on the shift position SP of the shift mechanism 5, which is detected by the position detecting device, and the driving force of the internal combustion engine 2.

In this way, according to the present embodiment, even when there occurs an abnormality in the position detecting device that detects the operating position of the shift mechanism 5, it is possible to appropriately reduce driving force through the driving force limiting process.

Hereinafter, the execution procedure and operation of the drive limiting routine according to the present embodiment will be described in detail with reference to the flowchart shown in FIG. 5 and FIG. 6. Note that a series of processes shown in the flowchart are periodically executed by the electronic control unit 7 as, for example, an interrupt at predetermined time intervals.

Figure 5:
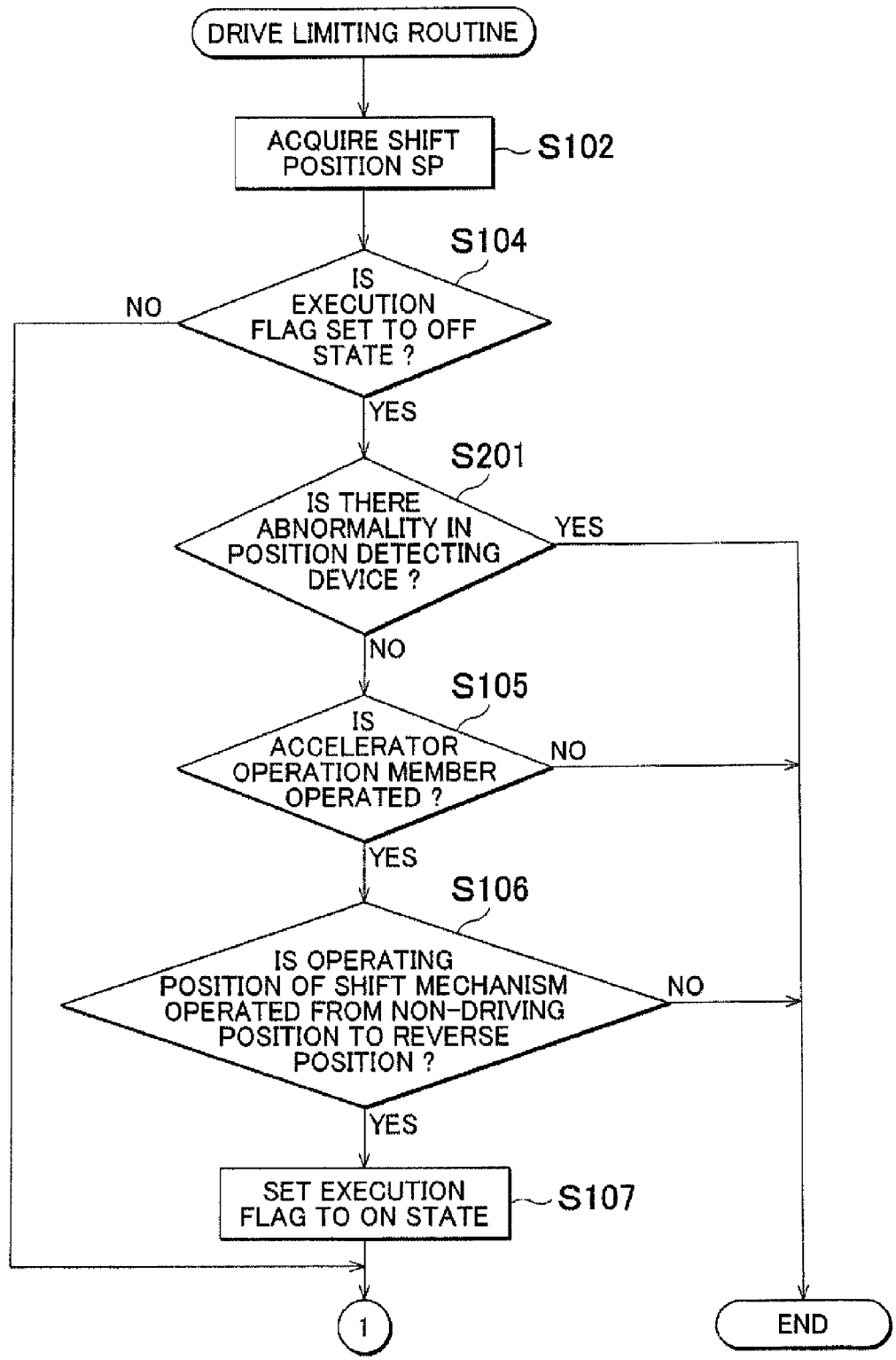
FIG. 5 is a flowchart that shows the execution procedure of a drive limiting routine according to a second embodiment of the invention.
Figure 6:
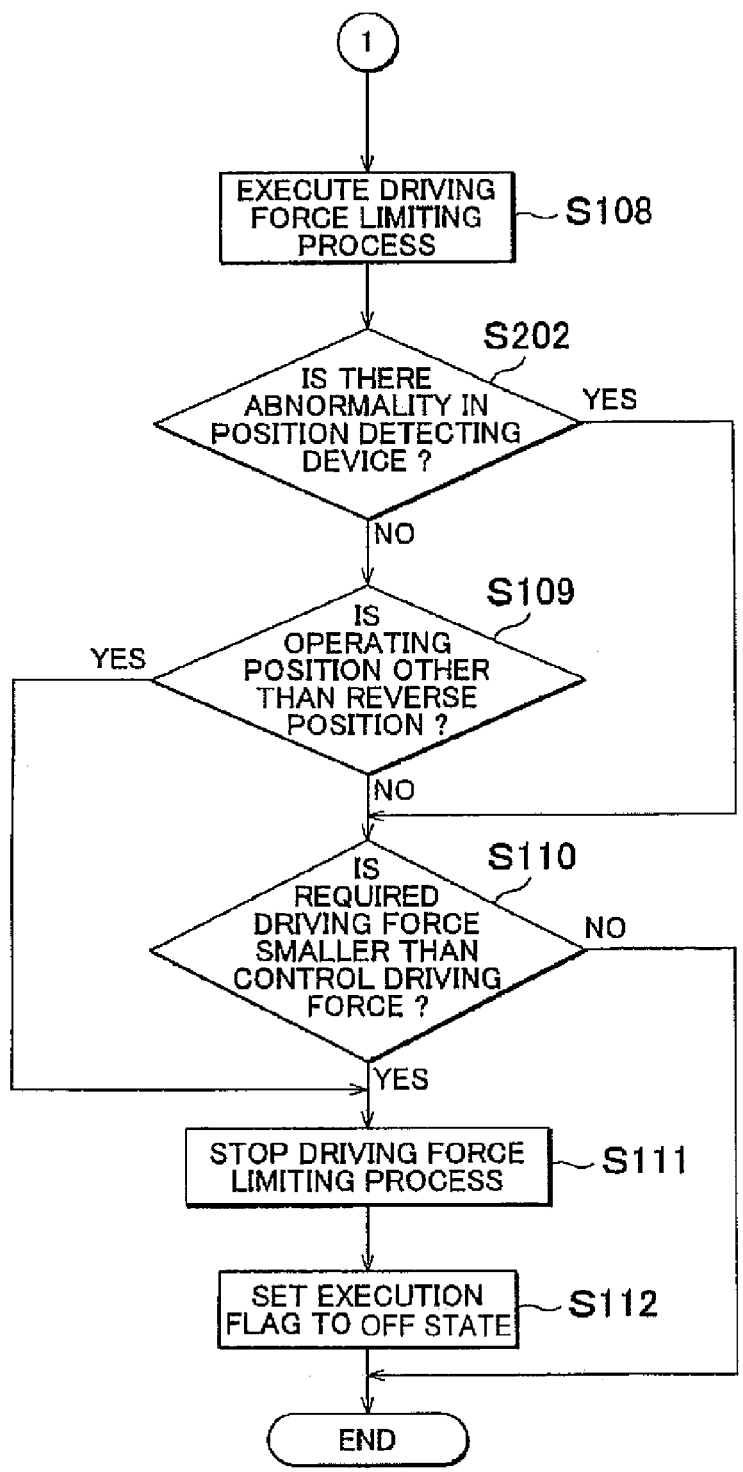
FIG. 6 is a flowchart that shows the execution procedure of the drive limiting routine.

As shown in FIG. 5, in this routine, initially, the shift position SP is acquired (S102), and it is determined whether the execution flag is set to an off state (S104). When the execution flag is set to an off state (YES in S104), it is determined whether there is an abnormality in the position detecting device (S201).

When it is determined that there is an abnormality in the position detecting device (YES in S201), the routine is once ended without executing the following processes in order to prohibit execution of the driving force limiting process.

On the other hand, when it is not determined that there is an abnormality in the position detecting device (NO in S201), it is determined whether to start the driving force limiting process (S105 and S106). Here, when both the condition 3 and the condition 4 are satisfied, it is determined to start the driving force limiting process.

When at least one of these conditions 3 and 4 is not satisfied (NO in S105 or NO in S106), it is determined not to start the driving force limiting process, and the routine is once ended without executing the following processes.

On the other hand, after that, when the routine is repeatedly executed and both the condition 3 and the condition 4 are satisfied (YES in S105 and YES in S106), the execution flag is set to an on state (S107), and the driving force limiting process (S108 in FIG. 6) is started. After that, unless the execution flag is set to an off state (NO in S104 in FIG. 5), the driving force limiting process is continued.

While the driving force limiting process is being executed (NO in S104 or YES in S106), the processes related to an end of the driving force limiting process (the process of S202 in FIG. 6 and the processes of S109 to S112) are executed.

Specifically, initially, it is determined whether there is an abnormality in the position detecting device that detects the shift position SP (S202). Here, when it is determined that there is an abnormality in the position detecting device (YES in S202), the process of S109 is skipped, and it is determined whether the condition 2 is satisfied (S110). Then, when the condition 2 is not satisfied (NO in S110), the driving force limiting process is not stopped but continued (the processes of S111 and S112 are skipped). After that, when the processes of the routine are repeatedly executed and the condition 2 is satisfied (YES in S110), the driving force limiting process is stopped (S111), and the execution flag is set to an off state (S112), after which the routine is once ended.

On the other hand, when it is not determined that there is an abnormality in the position detecting device (NO in S202), it is determined whether one of the condition 1 and the condition 2 is satisfied. Then, when both the condition 1 and the condition 2 are not satisfied (NO in S109 and NO in S110), the driving force limiting process is not stopped but continued (the processes of S111 and S112 are skipped). After that, when the processes of the routine are repeatedly executed and the condition 1 is satisfied (YES in S109) or when the condition 2 is satisfied (YES in S110), the driving force limiting process is stopped (S111), and the execution flag is set to an off state (S112), after which the routine once ends. By so doing, thereafter, limiting driving force that is output from the internal combustion engine 2 is stopped, and the driving force is adjusted so as to coincide with a required driving force that is a driving force that should be output from the internal combustion engine 2 on the basis of the accelerator operation amount ACC.

As described above, according to the present embodiment, advantageous effects described in the following 3) and 4) are obtained in addition to the advantageous effect described in 1).

3) When it is determined that there is an abnormality in the position detecting device in a state that the driving force limiting process is being executed, the execution mode of the driving force limiting process, which has been set on the basis of the shift position SP immediately before the abnormality occurs, is held even after the abnormality has occurred. Therefore, when it is not determined that there is an abnormality in the position detecting device, it is possible to stop the driving force limiting process at an appropriate timing based on the shift position SP of the shift mechanism 5, which is detected by the position detecting device, and the driving force of the internal combustion engine 2. In other words, it is possible to execute the driving force limiting process on the basis of the operating position that is detected by the position detecting device and the vehicle operation state. Moreover, when it is determined that there is an abnormality in the position detecting device, it is possible to stop the driving force limiting process at a proper timing on the condition that the condition 2 based on the driving force of the internal combustion engine 2 is satisfied. In other words, it is possible to execute the driving force limiting process while prohibiting a change of the execution mode based on the operating position having a low reliability, detected by the position detecting device, so it is possible to suppress a change of the execution mode of the driving force limiting process and a stop of the process at an undesirable timing. In this way, even when there occurs an abnormality in the position detecting device that detects the operating position of the shift mechanism, it is possible to appropriately reduce driving force through the driving force limiting process.

4) When it is determined that there is an abnormality in the position detecting device in a state that the driving force limiting process is not executed, the driving force limiting process is prohibited thereafter. Therefore, it is possible to avoid a state that the driving force limiting process is started on the basis of the operating position detected by the position detecting device having an abnormality, and it is possible to suppress unnecessary execution of the driving force limiting process, so it is possible to suppress an unnecessary decrease in driving performance of the vehicle 1 due to an unnecessary reduction in driving force that is output from the internal combustion engine 2. Moreover, when it is not determined that there is an abnormality in the position detecting device, it is possible to start the driving force limiting process at a proper timing on the basis of the shift position SP that is detected by the position detecting device and the accelerator operation amount ACC. In other words, it is possible to execute the driving force limiting process on the basis of the operating position that is detected by the position detecting device and the vehicle operation state.

Hereinafter, a driving control system for a vehicle according to a third embodiment of the invention will be described by focusing on the difference from the first and second embodiments. Hereinafter, like reference numerals denote similar components to those of the first and second embodiments, and the detailed description of the components is omitted.

The present embodiment differs from the first and second embodiments in the execution mode of the drive limiting routine. Hereinafter, the drive limiting routine according to the present embodiment will be described. In the drive limiting routine (FIG. 2) according to the first embodiment, when it is not determined that there is an abnormality in the position detecting device (NO in S101), the operating position of the shift mechanism 5, which is acquired on the basis of the shift position SP that is detected by the position detecting device, is used as the setting parameter for setting the execution mode of the driving force limiting process (S102). On the other hand, when it is determined that there is an abnormality in the position detecting device (YES in S101), the result of the forward travel determination made on the basis of the gear position of the automatic transmission 3 is used as the above setting parameter (S103).

In contrast to this, in the drive limiting routine according to the present embodiment, as in the case of the drive limiting routine according to the second embodiment, when it is determined that there is an abnormality in the position detecting device or when it is not determined that there is an abnormality in the position detecting device, the operating position of the shift mechanism 5, which is acquired from the shift position SP, is used as the above setting parameter. That is, in the present embodiment, the process of S101 and the process of S103 in the drive limiting routine (FIG. 2) according to the first embodiment are not executed.

In addition, in the drive limiting routine according to the first and second embodiments, when the shift mechanism 5 is operated from the non-driving position to the reverse position in a state where the accelerator operation member 9 is operated to an on state, the driving force limiting process is executed.

In contrast to this, in the drive limiting routine according to the present embodiment, when the accelerator operation member 9 is operated to an on state in a state where the shift mechanism 5 is operated to the reverse position, the driving force limiting process is executed. That is, while the vehicle 1 is travelling backward, driving force that is output from the internal combustion engine 2 is limited. While the vehicle 1 is travelling forward, the driving force is not limited.

While the vehicle 1 is travelling forward, the position of the driver seated on a seat is usually natural. In contrast to this, while the vehicle 1 is travelling backward, the driver mostly takes an unreasonable position, such as a position that the body is twisted to watch the backward of the vehicle while the driver is seated on the seat. Therefore, while the vehicle 1 is travelling backward, it is difficult to minutely operate the accelerator operation member 9 as compared with while the vehicle 1 is travelling forward. It is also difficult to minutely adjust driving force that is transmitted from the internal combustion engine 2 to the wheels 4. Thus, at this time, it easily leads to a decrease in drivability, for example, a state that the behavior of the vehicle 1 tends to be unnatural.

In the drive limiting routine according to the present embodiment, while the vehicle 1 of which the shift mechanism 5 is operated to the drive position is travelling forward, that is, the behavior of the vehicle 1 is hard to be unnatural because it is possible to minutely operate the accelerator operation member 9, the driving force limiting process is not executed. Therefore, while unnecessarily limiting driving force that is output from the internal combustion engine 2 is suppressed, the driving force of the vehicle 1 is adjusted in response to actual driver's operation of the accelerator operation member 9.

Moreover, while the vehicle 1 of which the shift mechanism 5 is operated to the reverse position is travelling backward, when the behavior of the vehicle 1 tends to be unnatural because it is difficult to minutely operate the accelerator operation member 9, the driving force limiting process is executed. Therefore, the vehicle 1 is driven in a state where driving force that is output from the internal combustion engine 2 is relatively small. Therefore, a change in the behavior of the vehicle 1 becomes gentle, and an unnatural behavior of the vehicle 1 is suppressed.

According to the present embodiment, driving force that is output from the internal combustion engine 2 is properly limited on the basis of the travel direction of the vehicle 1. Therefore, this avoids a state that the driver experiences a feeling of strangeness in both cases where the vehicle 1 is travelling forward and the vehicle 1 is travelling backward, so drivability improves.

In addition, in the drive limiting routine according to the first and second embodiments, the condition 1 based on the operating position of the shift mechanism 5 and the condition 2 based on the driving force of the internal combustion engine 2 are set as conditions for determining whether to stop the driving force limiting process. Then, when one of the condition 1 and the condition 2 is satisfied, the driving force limiting process is stopped.

In contrast to this, in the drive limiting routine according to the present embodiment, the condition 1 based on the operating position of the shift mechanism 5 is not set, and only the condition 2 based on the driving force of the internal combustion engine 2 is set as a condition for determining whether to stop the driving force limiting process. Then, when the condition 2 is satisfied, the driving force limiting process is stopped.

In the drive limiting routine according to the present embodiment, when it is determined that there is an abnormality in the position detecting device in a state that the driving force limiting process is not executed, setting the execution mode on the basis of the operating position of the shift mechanism 5 (specifically, setting whether to execute the driving force limiting process on the basis of the shift position SP) is prohibited, and the driving force limiting process is allowed on the basis of the accelerator operation amount ACC. Specifically, when it is determined that there is an abnormality in the position detecting device in a state that the driving force limiting process is not executed, the driving force limiting process is started on the basis of the fact that the accelerator operation member 9 is operated to an on state irrespective of the operating position of the shift mechanism 5, which is acquired from the shift position SP. In the present embodiment, the execution mode of the driving force limiting process, which is set on the basis of the operating position of the shift mechanism 5, is whether to execute the driving force limiting process.

By so doing, when it is determined that there is an abnormality in the position detecting device, that is, when the reliability of the shift position SP that is detected by the position detecting device is low, a start of the driving force limiting process based on the shift position SP is prohibited. Therefore, this avoids a state that the driving force limiting process is not started due to erroneous determination that the shift mechanical 5 is operated to the drive position although the driving force limiting process should be executed because the accelerator operation member 9 is operated to an on state in a state where the shift mechanism 5 is operated to the reverse position.

When it is not determined that there is an abnormality in the position detecting device, the driving force limiting process is started on the basis of the fact that the accelerator operation member 9 is operated to an on state in a state where the shift mechanism 5 is operated to the reverse position. In other words, the driving force limiting process is started at a proper timing on the basis of the shift position SP that is detected by the position detecting device and the accelerator operation amount ACC. That is, it is possible to execute the driving force limiting process on the basis of the operating position that is detected by the position detecting device and the vehicle operation state.

In this way, according to the present embodiment, even when there occurs an abnormality in the position detecting device that detects the operating position of the shift mechanism 5, it is possible to appropriately reduce driving force through the driving force limiting process.

Hereinafter, the execution procedure and operation of the drive limiting routine according to the present embodiment will be described in detail with reference to the flowchart shown in FIGS. 7A and 7B. Note that a series of processes shown in the flowchart are periodically executed by the electronic control unit 7 as, for example, an interrupt at predetermined time intervals.

Figure 7A:
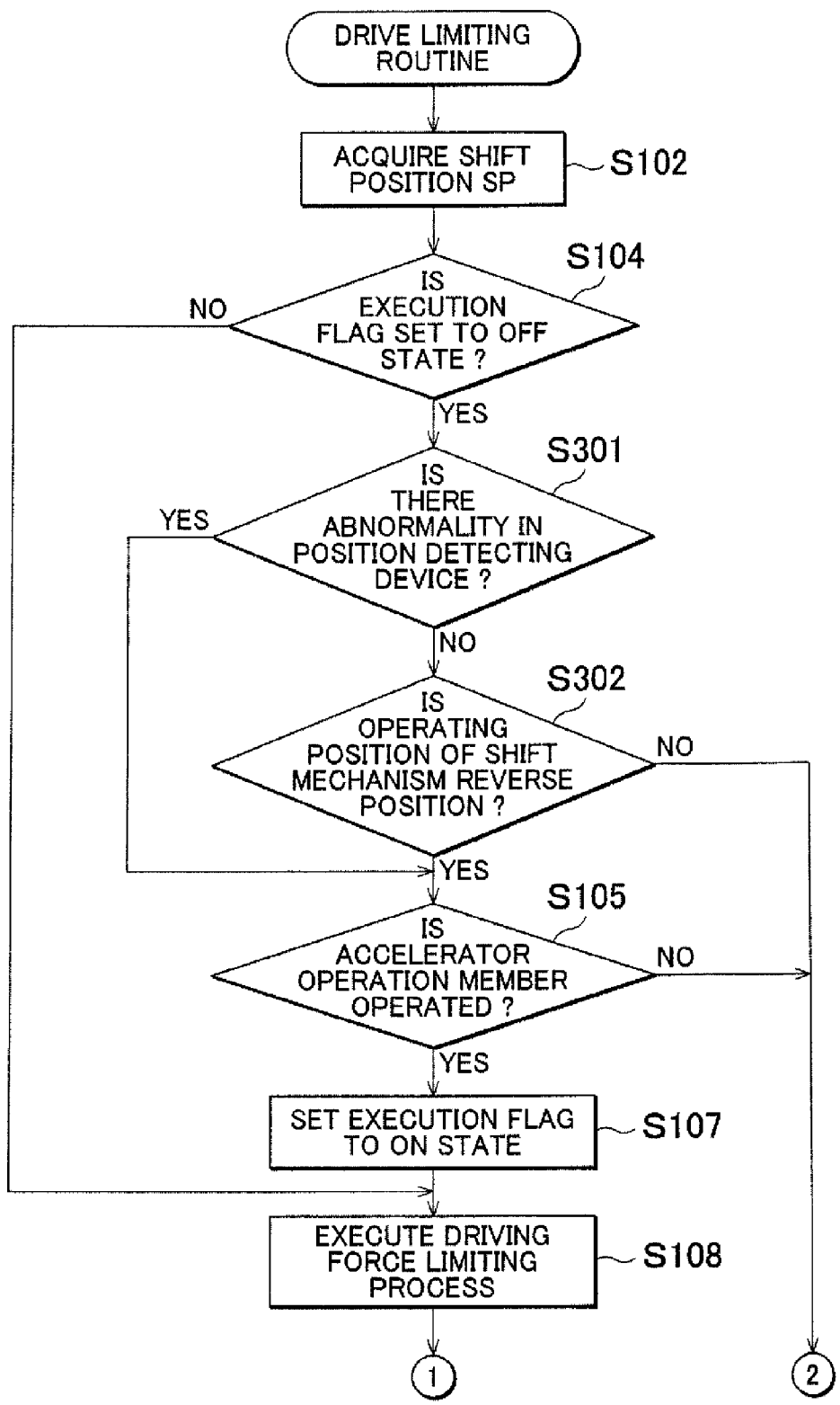
FIGS. 7A and 7B are a flowchart that shows the execution procedure of a drive limiting routine according to a third embodiment of the invention.
Figure 7B:
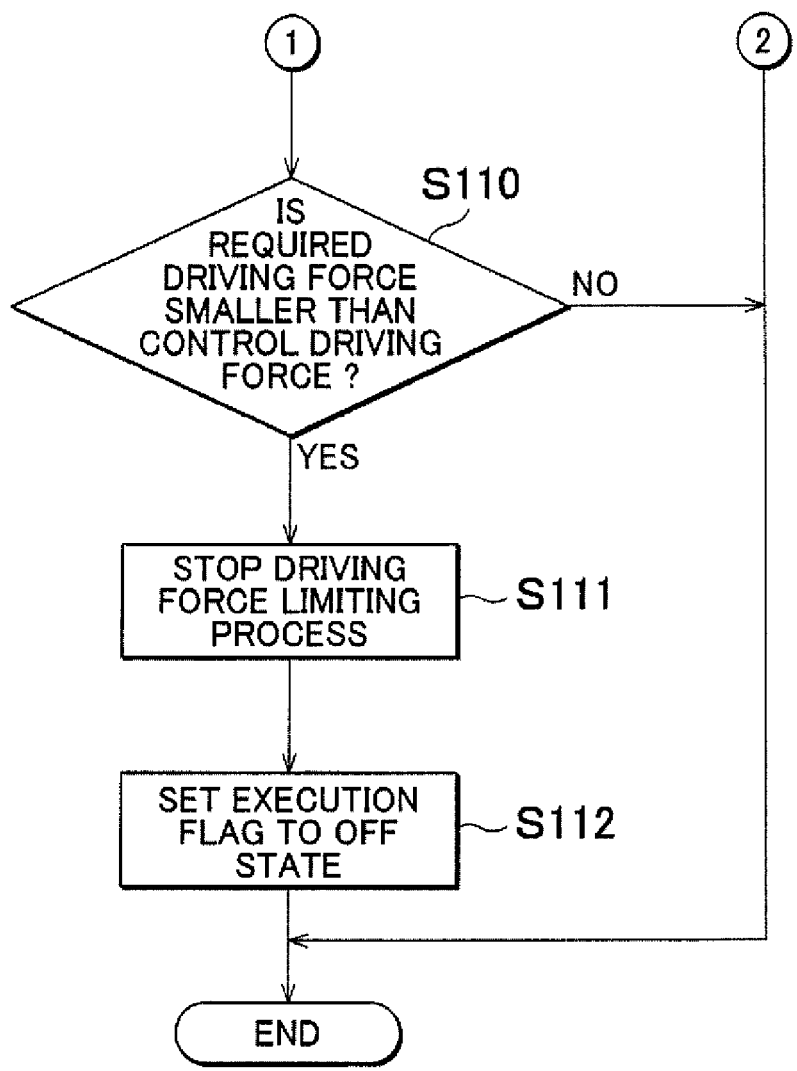

As shown in FIG. 7A, in this routine, initially, the shift position SP is acquired (S102), and it is determined whether the execution flag is set to an off state (S104).

When the execution flag is set to an off state (YES in S104), it is determined whether there is an abnormality in the position detecting device (S301). When it is not determined that there is an abnormality in the position detecting device (NO in S301), it is determined whether both the following conditions 5 and 3 are satisfied (S302 and S105) in order to determine whether to execute the driving force limiting process (S108).
Condition 5: The operating position of the shift mechanism 5 is the reverse position.

When one of these conditions 5 and 3 is not satisfied (NO in S302 or NO in S105), it is determined not to start the driving force limiting process, and the routine is once ended without executing the following processes. When both the condition 5 and the condition 3 are satisfied (YES in S302 and YES in S105), the execution flag is set to an on state (S107), and the driving force limiting process is started (S108).

On the other hand, when it is determined that there is an abnormality in the position detecting device (YES in S301), the process of S302 is skipped, and it is determined whether the condition 3 is satisfied (S105) in order to determine whether to execute the driving force limiting process. When the condition 3 is not satisfied (NO in S105), it is determined not to start the driving force limiting process, and the routine is once ended without executing the following processes. When the condition 3 is satisfied (YES in S105), the execution flag is set to an on state (S107), and the driving force limiting process is started (S108).

After the driving force limiting process is started, unless the execution flag is set to an off state (NO in S104), the driving force limiting process is continued (the processes of S111 and S112 are skipped). While the driving force limiting process is being executed, processes associated with an end of the driving force limiting process (processes of S110 to S112) are executed. That is, initially, it is determined whether the condition 2 is satisfied (S110). When the condition 2 is not satisfied (NO in S110), the driving force limiting process is not stopped but is continued. After that, when the processes of the routine are repeatedly executed and the condition 2 is satisfied (YES in S110), the driving force limiting process is stopped (S111), and the execution flag is set to an off state (S112), after which the routine is once ended. Thereafter, limiting driving force that is output from the internal combustion engine 2 is stopped, and the driving force is adjusted so as to coincide with a required driving force that is a driving force that should be output from the internal combustion engine 2 on the basis of the accelerator operation amount ACC.

As described above, according to the present embodiment, advantageous effects described below are obtained.

5) When it is determined that there is an abnormality in the position detecting device in a state that the driving force limiting process is not executed, determination as to whether to execute the driving force limiting process based on the shift position SP is prohibited, and execution of the driving force limiting process is allowed on the basis of the accelerator operation amount ACC. Therefore, even when there is an abnormality in the position detecting device that detects the operating position of the shift mechanism 5, it is possible to properly reduce driving force through the driving force limiting process.

6) The execution mode of the driving force limiting process is set so as to limit diving force that is output from the internal combustion engine 2 when the operating position of the shift mechanism 5 is operated to the reverse position and not to limit the driving force when the operating position of the shift mechanism 5 is operated to the drive position. Therefore, when there is no abnormality in the position detecting device, it is possible to properly limit driving force, which is output from the internal combustion engine 2, on the basis of the travel direction of the vehicle 1. In addition, even when there is an abnormality in the position detecting device, it is possible to properly reduce driving force through the driving force limiting process.

Note that the above-described embodiments may be modified into the following alternative embodiments. In each of the embodiments, if it is possible to reduce driving force that is output from the internal combustion engine 2, it is possible to selectively change the execution mode of the driving force limiting process. For example, the determination value HA may be a constant value irrespective of the vehicle speed SPD. Other than that, it is possible to selectively change the execution mode of the driving force limiting process on the basis of the driving state of the vehicle 1, other than the vehicle acceleration D. For example, the degree of limiting driving force that is output from the internal combustion engine 2 is changed on the basis of only the vehicle speed SPD or changed on the basis of the accelerator operation amount ACC.

In the first embodiment, the result of the forward travel determination as to whether the vehicle 1 is travelling forward is used as the setting parameter for setting the execution mode of the driving force limiting process when it is determined that there is an abnormality in the position detecting device. The operating position of the shift mechanism 5, which is estimated on the basis of the driving state of the vehicle 1 (the rotation direction of the wheels 4 or axles, vehicle speed SPD, steered angle, yaw rate, or the like) is used as the setting parameter instead of the result of the forward travel determination. With the thus configured system, not the operating position that is acquired from the shift position SP detected by the position detecting device having an abnormality but the operating position estimated on the basis of the driving state of the vehicle 1 may be used as the setting parameter. Therefore, when there is an abnormality in the position detecting device, it is possible to suppress a change of the execution mode of the driving force limiting process, a start of the process or a stop of the process at an undesirable timing.

Specifically, instead of executing the above-described forward travel determination, forward/backward travel determination (determination 1 or determination 2 below) as to whether the vehicle is travelling forward or travelling backward on the basis of the driving state of the vehicle 1 may be made, and the determination result may be used as the setting parameter. Determination 1: A rotation sensor that is able to detect the rotation direction and rotation speed of the wheels 4 (or axles) is installed in the vehicle 1, and it is determined whether the driving state of the vehicle 1 is a forward travel state, a backward travel state or a stopped state on the basis of a detected signal of the rotation sensor. Determination 2: A steered angle sensor for detecting a steered angle and a yaw rate sensor for detecting a yaw rate are installed in the vehicle 1, and it is determined whether the vehicle 1 is travelling forward or travelling backward on the basis of a relationship between the steered angle and the yaw rate (specifically, a variation direction of a yaw angle), which are respectively detected by those sensors.

With the thus configured system, even when there is an abnormality in the position detecting device, it is possible to accurately determine that the vehicle 1 is travelling forward or the vehicle 1 is travelling backward through the forward/backward travel determination. Therefore, it is possible to execute the process (S106 in FIG. 2) of determining whether the operating position of the shift mechanism 5 is shifted from the non-driving position to the reverse position or the process (S109) of determining whether the operating position of the shift mechanism 5 is shifted to a position other than the reverse position while suppressing erroneous determination.

In the second embodiment, one of the process of S201 and the process of S202 in the drive limiting routine (FIG. 5 and FIG. 6) may be omitted.

In each of the embodiments, the driving force limiting process is not executed when the operating position of the shift mechanism 5 is the drive position, and is executed when the operating position of the shift mechanism 5 is the reverse position. Instead, it is applicable that the driving force limiting process is executed when the operating position is the drive position or when the operating position is the reverse position and the degree of limiting driving force through the process is increased when the operating position is the reverse position as compared with when the operating position is the drive position. With the thus configured system, while the vehicle 1 is travelling forward, that is, when it is possible to minutely operate the accelerator operation member 9, the degree of limiting the driving force of the vehicle 1 is decreased, so it is possible to adjust the driving force of the vehicle 1 in a manner close to driver's actual operation of the accelerator operation member 9. Moreover, while the vehicle 1 is travelling backward, that is, when it is difficult to minutely operate the accelerator operation member 9, the degree of limiting the driving force of the vehicle 1 is increased, so it is possible to drive the vehicle 1 in a small driving force state. Therefore, it is possible to make a change in the behavior of the vehicle gentle, and it is possible to suppress an unnatural behavior. In the thus configured system, the execution mode of the driving force limiting process, which is set on the basis of the operating position of the shift mechanism 5, is whether to execute the driving force limiting process and the degree of limiting the driving force through the driving force limiting process.

The system according to the first embodiment or the system according to the second embodiment is not limited to the system that executes the driving force limiting process when the operating position of the shift mechanism 5 is operated from the non-driving position to the reverse position, but it may also be applied to a system that executes the driving force limiting process when the operating position of the shift mechanism 5 is operated from the non-driving position to the driving position (drive position or reverse position). In other words, the execution mode may be set such that driving force is limited through the driving force limiting process when the operating position of the shift mechanism is a backward travel position and driving force is not limited through the driving force limiting process when the operating position is a forward travel position. That is, limiting the driving force is prohibited when the operating position is a forward travel position. In this way, instead of the configuration that the degree of limiting driving force is employed, whether to execute the driving force limiting process may be employed. Specifically, in the drive limiting routine, the process of S106 may be changed to the "process of determining whether a condition that the operating position of the shift mechanism 5 at the time when the routine is executed last time is the non-driving position and the operating position of the shift mechanism 5 at the time when the routine is executed this time is the driving position is satisfied", and the process of S109 may be changed to the "process of determining whether the operating position of the shift mechanism 5 is shifted to the non-driving position". With this configuration, when there is no abnormality in the position detecting device while the vehicle is travelling forward, that is, when it is possible to minutely operate the accelerator operation member, driving force is not limited, so it is possible to adjust the driving force of the vehicle on the basis of driver's actual operation of the accelerator operation member. In addition, when there is no abnormality in the position detecting device while the vehicle is travelling backward, that is, when it is difficult to minutely operate the accelerator operation member, the driving force of the vehicle is limited, so it is possible to drive the vehicle in a small driving force state. Therefore, it is possible to make a change in the behavior of the vehicle gentle, and it is possible to suppress an unnatural behavior.

In each of the embodiments, the driving force limiting process is executed in the execution mode (condition 4 or condition 5) that is set on the basis of the operating position of the shift mechanism 5 and the accelerator operation amount ACC (condition 3). The systems of the embodiments may be applied to not only the above system but also a system that executes the driving force limiting process on the basis of an execution mode that is set on the basis of the operating position of the shift mechanism 5 and a vehicle operation state (the steering angle of the steering wheel, or the like) other than the accelerator operation amount ACC.

The invention is applicable to not only a vehicle on which a multi-gear automatic transmission having a plurality of gear positions is mounted but also a vehicle on which a continuously variable automatic transmission that varies a speed ratio steplessly. When the driving control system according to the first embodiment is applied to the vehicle on which such a continuously variable automatic transmission is mounted, it is just required to make forward travel determination on the basis of the speed ratio of the automatic transmission, which is acquired by the electronic control unit 7.

The invention is applicable to not only a vehicle on which an internal combustion engine is mounted as a driving source but also a vehicle on which a prime mover is mounted as a driving source, such as a vehicle on which an electric motor is mounted as a driving source and a vehicle on which an internal combustion engine and an electric motor are mounted as driving sources.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

What is claimed is:

1. A driving control system for a vehicle, comprising:
a shift mechanism that is operated to selectively shift into one of operating positions, that is, a driving position in which driving force that is output from a prime mover is transmitted to a wheel and a non-driving position in which transmission of the driving force from the prime mover to the wheel is interrupted;
a position detecting device that detects the operating position of the shift mechanism on the basis of an output signal of a sensor attached to the shift mechanism; and
a controller that sets an execution mode of a driving force limiting process that limits the driving force on the basis of the operating position that is detected by the position detecting device, and that executes the driving force limiting process on the basis of the execution mode and a vehicle operation state that is an operation state of the vehicle, wherein
when the controller determines that there is an abnormality in the position detecting device in a state that the driving force limiting process is not executed, the controller prohibits setting the execution mode based on the operating position, and allows the driving force limiting process to be executed on the basis of the vehicle operation state.

2. The driving control system according to claim 1, wherein
the vehicle operation state is an operation amount of an accelerator operation member.

3. The driving control system according to claim 1, wherein
the controller sets the execution mode such that a degree of limiting the driving force is increased when the operating position is a backward travel position as compared with when the operating position is a forward travel position.

4. The driving control system according to claim 1, wherein
the controller sets the execution mode such that the driving force is limited when the operating position is a backward travel position in which the vehicle travels backward and limiting the driving force is prohibited when the operating position is a forward travel position in which the vehicle travels forward.

5. The driving control system according to claim 1, wherein
the execution mode is whether to execute the driving force limiting process.

6. A driving control system for a vehicle, comprising:
a shift mechanism that is operated to selectively shift into one of operating positions, that is, a driving position in which driving force that is output from a prime mover is transmitted to a wheel and a non-driving position in which transmission of the driving force from the prime mover to the wheel is interrupted;
a position detecting device that detects the operating position of the shift mechanism on the basis of an output signal of a sensor attached to the shift mechanism; and
a controller that sets an execution mode of a driving force limiting process that limits the driving force on the basis of the operating position that is detected by the position detecting device, and that executes the driving force limiting process on the basis of the execution mode and a vehicle operation state that is an operation state of the vehicle, wherein
when the controller determines that there is an abnormality in the position detecting device in a state that the driving force limiting process is being executed, the controller holds the execution mode that has been set immediately before the abnormality occurs.

7. The driving control system according to claim 6, wherein
the controller executes the driving force limiting process when the operating position is shifted from the non-driving position to the driving position in a state where the accelerator operation member is operated, and the vehicle operation state is an operation amount of the accelerator operation member.

8. The driving control system according to claim 6, wherein the controller sets the execution mode such that a degree of limiting the driving force is increased when the operating position is a backward travel position as compared with when the operating position is a forward travel position.

9. The driving control system according to claim 6, wherein the controller sets the execution mode such that the driving force is limited when the operating position is a backward travel position in which the vehicle travels backward and limiting the driving force is prohibited when the operating position is a forward travel position in which the vehicle travels forward.

10. The driving control system according to claim 6, wherein the execution mode is whether to execute the driving force limiting process.

11. A driving control system for a vehicle, comprising:

a shift mechanism that is operated to selectively shift into one of operating positions, that is, a driving position in which driving force that is output from a prime mover is transmitted to a wheel and a non-driving position in which transmission of the driving force from the prime mover to the wheel is interrupted;

a position detecting device that detects the operating position of the shift mechanism on the basis of an output signal of a sensor attached to the shift mechanism; and a controller that sets an execution mode of a driving force limiting process that limits the driving force on the basis of the operating position that is detected by the position detecting device, and that executes the driving force limiting process on the basis of the execution mode and a vehicle operation state that is an operation state of the vehicle, wherein when the controller determines that there is an abnormality in the position detecting device in a state that the driving force limiting process is not executed, the controller prohibits execution of the driving force limiting process.

12. The driving control system according to claim 11, wherein the controller executes the driving force limiting process when the operating position is shifted from the non-driving position to the driving position in a state where the accelerator operation member is operated, and the vehicle operation state is an operation amount of the accelerator operation member.

13. The driving control system according to claim 11, wherein the controller sets the execution mode such that a degree of limiting the driving force is increased when the operating position is a backward travel position as compared with when the operating position is a forward travel position.

14. The driving control system according to claim 11, wherein the controller sets the execution mode such that the driving force is limited when the operating position is a backward travel position in which the vehicle travels backward and limiting the driving force is prohibited when the operating position is a forward travel position in which the vehicle travels forward.

15. The driving control system according to claim 11, wherein the execution mode is whether to execute the driving force limiting process.

16. A driving control system for a vehicle, comprising:

a shift mechanism that is operated to selectively shift into one of operating positions, that is, a driving position in which driving force that is output from a prime mover is transmitted to a wheel and a non-driving position in which transmission of the driving force from the prime mover to the wheel is interrupted;

a position detecting device that detects the operating position of the shift mechanism on the basis of an output signal of a sensor attached to the shift mechanism; and a controller that sets an execution mode of a driving force limiting process that limits the driving force on the basis of the operating position that is detected by the position detecting device, and that executes the driving force limiting process on the basis of the execution mode and a vehicle operation state that is an operation state of the vehicle, wherein when there is an abnormality in the position detecting device, the controller uses an operating position of the shift mechanism, that is estimated on the basis of a driving state of the vehicle, as a setting parameter for setting the execution mode of the driving force limiting process, instead of the operating position that is detected by the position detecting device.

17. The driving control system according to claim 16, wherein the vehicle includes an automatic transmission that automatically carries out gear shift operation and a speed ratio detecting device that detects a speed ratio, and when there is an abnormality in the position detecting device, the controller determines whether the vehicle is travelling forward on the basis of the speed ratio that is detected by the speed ratio detecting device, and sets a result of the determination as the setting parameter.

18. The driving control system according to claim 16, wherein the controller sets the execution mode such that a degree of limiting the driving force is increased when the operating position is a backward travel position as compared with when the operating position is a forward travel position.

19. The driving control system according to claim 16, wherein the controller sets the execution mode such that the driving force is limited when the operating position is a backward travel position in which the vehicle travels backward and limiting the driving force is prohibited when the operating position is a forward travel position in which the vehicle travels forward.

20. The driving control system according to claim 16, wherein the execution mode is whether to execute the driving force limiting process.

\* \* \* \* \*

UNITED STATES PATENT AND TRADEMARK OFFICE
CERTIFICATE OF CORRECTION

PATENT NO. : 8,751,120 B2  
APPLICATION NO. : 13/712601  
DATED : June 10, 2014  
INVENTOR(S) : Yuki Minase et al.

Page 1 of 1

It is certified that error appears in the above-identified patent and that said Letters Patent is hereby corrected as shown below:

On the Title Page:

(73) Assignee: after "Toyota Jidosha Kabushiki", insert --Kaisha--.

Signed and Sealed this  
Twenty-third Day of December, 2014

Michelle K. Lee  
*Deputy Director of the United States Patent and Trademark Office*